Patented July 14, 1936

2,047,297

UNITED STATES PATENT OFFICE 2,047,297

CORE AND OIL THEREFOR

Rodolphe Stahl, Detroit, Mich., assignor to Aristo Corporation, a corporation of Michigan No Drawing. Application December 5, 1930
Serial No. 500,433

22 Claims. (Cl. 22—188)

This invention relates to hydro-carbon compounds, the principal object being to provide a substitute for linseed and other oils conventionally employed in the manufacture of baked sand cores, as well as a core made by the use thereof.

Another object is the commercial utilization of certain heretofore undesirable compounds produced in the refining of petroleum, as well as the provision of an economical baked sand core of maximum strength and toughness.

In the preparation of marketable gasoline which will remain water-white in color, of agreeable odor and free from gum it has been found necessary to treat the gasoline with some reactive material which will induce polymerization of the highly unsaturated hydro-carbons contained therein. The agents most commonly used that effect this reaction are concentrated sulfuric acid and fuller's earth.

The sulfuric acid treatment involves a mixture of an amount of acid varying from one-quarter of one per cent to as much as five per cent by weight of the oil to be treated. The method employed is preferably to mix a sufficient amount of the concentrated sulfuric acid in the oil to be treated and subject the resulting mixture to treatment in a suitable reacting device. In the subsequent polymerization of the highly unsaturated hydro-carbons, the polymers are separated out with the acid, together with certain esters and sulphonates in the form of sludge which are formed during the reaction, and may be drawn off from the treated gasoline. The spent acids, polymers, esters and sulphonates thus drawn off have heretofore been regarded as a nuisance, and the polymers have either been thrown away or burned as fuel. In accordance with the present invention I wash this mixture with a quantity of water, the polymers rising to the top, thus allowing the spent acid, esters and sulphonates to be drawn off the bottom, leaving the polymers in their crude state.

In the use of fuller's earth, the gasoline to be treated is brought into contact with fuller's earth when at relatively high temperatures, either in the vapor phase, or in the liquid phase under high pressure. In the resulting polymerization of the highly unsaturated hydro-carbons the polymers separated out may be drawn off in relatively pure form or condition. The dark colored high boiling point polymers produced by this action have heretofore usually been thrown into fuel oil as a means of disposing of the same.

In order to understand the purposes of this invention it is necessary to understand the principal reaction involved in both of these methods of treatment. The compounds which are most undesirable and which must be quantitatively removed to produce a satisfactory marketable gasoline are known as diolefines. In their simplest forms they have the formula $C_nH_{2n-2}$ and have two double bonds per molecule. One of the simplest members of the series is butadiene which has the formula $C_4H_6$. Written structurally it is

When this compound is polymerized it becomes $(C_4H_6)_n$, where $n$ may equal almost any conceivable number. As the size of $n$ increases the boiling point, specific gravity and viscosity increase also. It is therefore readily understood that the polymerized fraction produced by treating gasoline distillates by either of the methods outlined above will contain a series of hydro-carbons having a very wide range of boiling points.

I have discovered that there are certain fractions of this material which are ideally suitable for use as a core oil, that is, as a binder agent for the particles of sand in a baked sand core, and this by reason of the fact that when it is subjected to heat, air, or other oxidizing reagents, it forms a resinous product. Specific gravity, viscosity, iodine number and drying time of this material can be very closely controlled by fractionating the crude polymers. For this purpose any conventional oil refining still may be used, and the distillation may be effected either with or without the use of steam.

For instance, certain fractions of this material possess the desirable properties of linseed oil, which is perhaps the highest grade of conventional core oils heretofore used. For most purposes, in order to obtain those fractions which may be substituted for linseed oil as a core oil, it is quite satisfactory merely to remove the light fractions and use the residue prepared to meet the desired specifications. Where the distillation is carried on further, however, the residue will consist of a high melting point pitchlike product.

I have found that the high melting point pitchlike product which is obtained in the distillation of the polymers as above described possesses excellent properties for use as a core oil compound instead of linseed oil, as is commonly employed in the manufacture of sand cores for molding purposes in the best of practices. Inasmuch as such polymers have heretofore been regarded as a nuisance and generally thrown away or burned, they may be produced and sold at a percentage of the cost of linseed oil, thus effecting a marked saving in the cost of the production of cores.

In using such polymers as a core oil in making baked cores it is mixed with the sand and baked in the usual manner. The sand used in such cases may be of the same type generally employed in making baked cores, that is, sea sand, silica sand, or the like. The amount of polymer used in the composition is, as in the case of the usual core oil, dependent to a certain extent upon the casting to be produced. Where heavy castings are to be produced as low as 20 parts of sand to one part of polymer may be used to produce the core, while in cores for light work the ratio may be increased to as much as 200 parts of sand to one part of polymers.

Cores made in this manner may be baked in the same manner and at temperatures commensurate with those employed in connection with the usual types of core oils, that is, around 400° F., although I find that lower temperatures may be employed and the relative length of baking time be shortened by using polymers.

If a slight amount of linseed oil is added to the mixture to prevent the drying action going too far and rendering the finished product less brittle, I find that the finished product is of greater strength than when a mixture of linseed oil only, or linseed oil and kerosene, are mixed with the core sand as in conventional practices. Although such core oil may comprise 100 per cent polymers, I find mixtures of substantially the following proportions preferable.

| | Percent |
|---|---|
| Polymers | 20 to 90 |
| Linseed oil | 10 to 40 |
| Resin, kerosene and/or cheap vegetable oils up to | 40 |

The quantity of linseed oil employed in the mixture is, of course, largely determined by the characteristics desired in the finished product. In general, the polymerized diolefine product gives greater strength to the dried core and fewer gas bubbles in the finished castings than linseed oil, and the cores may be baked in less time at a lower temperature than with conventional core oils. In addition, the "hot" strength of the core is equally as good as where linseed oil is used, and the core may be broken up more easily after the casting is completed and will have a less detrimental surface coating than where conventional core oils are employed.

Formal changes may be made in the specific embodiment of the invention described without departing from the spirit and substance of the broad invention, the scope of which is commensurate with the appended claims.

I claim:

1. A liquid core oil comprising a mixture of polymerized diolefines and an unpolymerized vegetable oil.

2. A liquid core oil comprising a predetermined fraction of the polymerized diolefines obtained in treatment of hydro-carbon distillates and an unpolymerized vegetable oil.

3. A liquid core oil comprising a mixture of polymerized diolefines and unpolymerized linseed oil.

4. An oil in liquid state for use in the manufacture of baked sand cores comprising a mixture of polymerized diolefines and unpolymerized linseed oil.

5. An oil in liquid state used in the manufacture of baked sand cores comprising a mixture of polymerized diolefines, unpolymerized linseed oil and resin.

6. A core oil comprising the heavier fractions of polymerized diolefines, said polymerized diolefines being the liquid product resulting when cracked petroleum distillates are brought into contact with solid absorbents.

7. A liquid core oil comprising the heavier fractions of polymerized diolefines produced in the treatment of gasoline distillates, and unpolymerized linseed oil.

8. A liquid core oil having as active constituents 25 per cent to 65 per cent of unpolymerized linseed oil and 40 per cent to 75 per cent of polymerized diolefines.

9. A liquid core oil containing from 25 per cent to 65 per cent of unpolymerized linseed oil, 40 per cent to 75 per cent of polymerized diolefines, and up to 25 per cent of resin.

10. A baked sand core comprising a mixture of sand and polymerized diolefines.

11. A baked sand core comprising a mixture of sand, polymerized diolefines and kerosene.

12. A baked sand core comprising a mixture of sand, polymerized diolefines, kerosene and a vegetable oil.

13. A baked sand core comprising a mixture of sand, polymerized diolefines, and linseed oil.

14. A baked sand core comprising a mixture of sand, polymerized diolefines, linseed oil, and kerosene.

15. A composition for forming cores comprising a binder including polymer, said polymer being the liquid product resulting when cracked petroleum distillates are brought in contact with solid adsorbents.

16. A composition for forming cores comprising sand and polymer in the proportion of 20 to 200 parts of the former to 1 part of the latter, said polymer being the liquid product resulting when cracked petroleum distillates are brought in contact with solid adsorbents.

17. A composition for forming cores comprising sand, polymer, a drying oil, resin, and a diluent, said polymer being the liquid product resulting when cracked petroleum distillates are brought in contact with solid adsorbents.

18. A core comprising sand and partially oxidized or resinified polymer, said resinified polymer being the product resulting when cracked petroleum distillates are brought in contact with solid adsorbents and subsequently oxidized.

19. A core comprising sand, resinified polymer, an oxidized drying oil and resin, said resinified polymer being the product resulting when cracked petroleum distillates are brought in contact with solid adsorbents and subsequently oxidized.

20. A core comprising approximately 20 to 200 parts of sand to 1 part of resinified or polymerized polymer, said resinified polymer being the product resulting when cracked petroleum distillates are brought in contact with solid adsorbents and subsequently oxidized.

21. A composition for forming cores comprising a binder including polymer and an unpolymerized vegetable oil, said polymer being the liquid product resulting when cracked petroleum distillates are brought in contact with solid absorbents.

22. A composition for forming cores comprising a binder including polymer and an unpolymerized linseed oil, said polymer being the liquid product resulting when cracked petroleum distillates are brought in contact with solid absorbents.

RODOLPHE STAHL.